(12) United States Patent
Höß

(10) Patent No.: US 11,758,638 B2
(45) Date of Patent: Sep. 12, 2023

(54) APPARATUS FOR PRODUCING A FILAMENTED AUXILIARY DISCHARGE FOR AN APPARATUS FOR PRODUCING X-RADIATION AND PARTICLE RADIATION AND ALSO FOR A FUSION REACTOR WITH THE APPARATUS FOR PRODUCING X-RADIATION AND PARTICLE RADIATION AND METHOD FOR PRODUCING X-RADIATION AND PARTICLE RADIATION

(71) Applicant: Paul Höß KG, Munich (DE)

(72) Inventor: Paul Höß, Munich (DE)

(73) Assignee: PAUL HOSS KG, Munich (DE)

( * ) Notice: Subject to any disclaimer, the term of this patent is extended or adjusted under 35 U.S.C. 154(b) by 526 days.

(21) Appl. No.: 17/252,238

(22) PCT Filed: Jun. 3, 2019

(86) PCT No.: PCT/EP2019/064368
§ 371 (c)(1),
(2) Date: Dec. 14, 2020

(87) PCT Pub. No.: WO2019/238458
PCT Pub. Date: Dec. 19, 2019

(65) Prior Publication Data
US 2021/0259088 A1    Aug. 19, 2021

(30) Foreign Application Priority Data
Jun. 14, 2018    (DE) .......................... 102018114295.1

(51) Int. Cl.
*H05H 1/48*    (2006.01)
*H05G 2/00*    (2006.01)

(52) U.S. Cl.
CPC ............. *H05G 2/003* (2013.01); *H05G 2/008* (2013.01); *H05H 1/48* (2013.01)

(58) Field of Classification Search
CPC .......... H05G 2/003; H05G 2/008; H05G 2/00; H05H 1/48; Y02E 30/10; G21B 1/00
See application file for complete search history.

(56) References Cited

U.S. PATENT DOCUMENTS 7,482,607 B2 *   1/2009   Lerner ..................... G21B 3/00
                                                      250/493.1
2004/0071267 A1   4/2004   Jacob et al.
(Continued)

OTHER PUBLICATIONS

S Ahmad et al. "The effect of pre-ionization by a shunt resistor on the reproducibility of plasma focus x-ray emission" Plasma Sources Science and Technology, 15, p. 314-321, 2006. DOI: 10.1088/0963-0252/15/3/003.
(Continued)

*Primary Examiner* — Courtney D Thomas
(74) *Attorney, Agent, or Firm* — MOSER TABOADA

(57) ABSTRACT

The present application relates to a device for generating X-ray radiation and particle radiation by means of nuclear fusion, comprising: an anode and a cathode, which are separated from each other by an insulator and are arranged coaxially to each other, wherein the anode and the cathode are arranged at least partially in a reactor chamber and the cathode has a plurality of cathode electrodes a pre-discharge device for generating a pre-discharge that forms a low-impedance bridging across the insulator a gas that is contained in the reactor chamber; an electrical pre-discharge source, especially with high internal resistance that is connected with the pre-discharge device; and an electrical discharge source that is electrically connected to the confined anode and the cathode, wherein a dense, magnetically confined plasmoid is generated in front of the anode as a result of an electrical discharge from the electrical discharge source and one or more ion beams, one or more X-rays or combinations thereof are emitted.

12 Claims, 6 Drawing Sheets

(56) References Cited

U.S. PATENT DOCUMENTS

| | | |
|---|---|---|
| 2004/0135103 A1 | 7/2004 | Wester |
| 2004/0178365 A1 | 9/2004 | Rice |
| 2006/0273732 A1 | 12/2006 | Korobochko et al. |
| 2007/0201598 A1 | 8/2007 | Lerner et al. |

OTHER PUBLICATIONS

International Search Report for Application No. PCT/EP2019/064368, dated Sep. 4, 2019.

\* cited by examiner

APPARATUS FOR PRODUCING A FILAMENTED AUXILIARY DISCHARGE FOR AN APPARATUS FOR PRODUCING X-RADIATION AND PARTICLE RADIATION AND ALSO FOR A FUSION REACTOR WITH THE APPARATUS FOR PRODUCING X-RADIATION AND PARTICLE RADIATION AND METHOD FOR PRODUCING X-RADIATION AND PARTICLE RADIATION

TECHNICAL FIELD

The present application relates to a device for generating X-ray radiation and particle radiation by means of nuclear fusion, to a fusion reactor having a device for generating X-ray radiation and particle radiation, and to a method for generating X-ray radiation and particle radiation. The application relates in particular to a device for generating X-ray radiation and particle radiation by means of nuclear fusion with a device for generating a defined, filamented pre-discharge, especially a glow discharge, to a fusion reactor with a device for generating X-ray radiation and particle radiation, having a device for generating a defined, filamented pre-discharge, especially a glow discharge, and to a method for generating X-ray radiation and particle radiation as well as a defined, filamented pre-discharge, especially a glow discharge

BACKGROUND OF THE INVENTION

With no intention of limiting the scope of the invention, the invention is described against the background of fusion reactors. The increase in energy consumption and the disadvantages of fossil fuels have led to a search for alternative energy sources. One such source of energy is the fusion energy of thermo-nuclear fusion reactors, this being an almost limitless energy source. However, there are still scientific and technical challenges.

In general, a fusion reactor has fusion fuel, which often consists of or includes a mixture of deuterium and tritium, heated to a very high temperature and maintained in a plasma state for a certain time. The plasma state is created using electrical energy. The plasma state contains ions that have sufficient energy to fuse. In order to fuse, the ions must be held together long enough for fusion to be able to take place. This can be effected by magnetic confinement, for example. Generally, the products of the fusion reactor may include elements, such as helium, neutrons, and energy. The energy released in most nuclear processes is much greater than in chemical reactions, since the bond energy that holds a nucleus together is much greater than the energy that binds the electrons to a nucleus. In most reactor designs, the energy released from the reaction is collected as thermal energy and then converted into electrical energy.

Several fusion devices have already been developed, including the tokamak reactor, z-pinch, spherical pinch, laser, ion or electrode beam, and spheromak. However, these reactors have not yet reached their goals. One difficulty is that when the plasma is being heated, instabilities occur that prevent the magnetic fields from trapping the heated, ionized gas long enough for the break-even point for energy production to be exceeded. As a possible solution for the instability, "dense plasma focus" (DPF) reactors have been discussed. In these reactors, natural plasma instabilities are used to create a magnetic confinement in a dense plasmoid, as opposed to the approach taken in other devices to suppress instabilities.

Such a method and device is described in U.S. Pat. No. 7,482,607 B2 and EP 1 989 714 B1 by Lerner et al. The device described in U.S. Pat. No. 7,482,607 B2 and EP 1 989 714 B1 has an anode and a number of cathodes that are separated from one another by an insulator and are arranged coaxially to one another. The anode and the cathodes are at least partially disposed in a reactor chamber. The anode and the cathodes are arranged such that they can apply an angular momentum to a plasmoid. For example, the cathodes have a spiral twist to apply angular momentum to the plasmoid. Alternatively, a helical coil can be positioned around the cathodes in order to apply an angular momentum to the plasmoid and give it a precisely defined moment of inertia. The angular momentum is intended to generate a dense, magnetically confined plasmoid in a gas-filled reactor chamber, which in turn generates X-ray radiation and particle radiation.

However, the conditions under which the angular momentum is generated are not precisely defined in the aforementioned device. The starting conditions for the process for generating the X-ray radiation and particle radiation by means of nuclear fusion are thus not precisely defined either.

In view of the foregoing, there is a need for a device and a method for generating X-ray radiation and particle radiation that brings about an improvement in at least some of the problem areas identified above.

SUMMARY OF THE INVENTION

The present invention recognizes the need for a device for generating a defined, in particular a filamented pre-discharge or auxiliary discharge for a fusion reactor, in particular for a device and a method for generating X-ray radiation and particle radiation by means of nuclear fusion. The device for generating a defined, in particular a filamented pre-discharge may in particular be suitable for generating defined starting conditions, for example, for a moment of inertia.

According to one aspect, a device for generating X-ray radiation and particle radiation by means of nuclear fusion is provided. The device includes: an anode and a cathode or a number of cathodes, separated from each other by an insulator and arranged coaxially to each other, wherein the anode and the cathode(s) are arranged at least partially in a reactor chamber; a pre-discharge device for generating a filamented pre-discharge that forms a low-impedance bridging across the insulator; a gas that is contained in the reactor chamber; an electrical pre-discharge source, especially with high internal resistance, that is connected to the pre-discharge device; and an electrical discharge source that is electrically connected to the anode and the cathode, wherein a dense, magnetically confined plasmoid is generated in front of the anode as a result of an electrical discharge from the electrical discharge source and one or more ion beams, one or more X-rays, or combinations thereof are emitted.

According to one aspect, a fusion reactor having a device for generating X-ray radiation and particle radiation is provided. The device includes: an anode and a cathode or a number of cathodes, separated from each other by an insulator and arranged coaxially to each other, wherein the anode and the cathode(s) are arranged at least partially in a reactor chamber; a pre-discharge device for generating a filamented pre-discharge that forms a low-impedance bridging across the insulator; a gas that is contained in the reactor chamber; an electrical pre-discharge source, especially with high internal resistance, that is connected to the pre-discharge device; and an electrical discharge source that is electrically connected to the anode and the cathode, wherein a dense, magnetically confined plasmoid is generated in front of the anode as a result of an electrical discharge from the electrical discharge source and one or more ion beams, one or more X-rays, or combinations thereof are emitted.

According to one aspect, a method for generating X-ray radiation and particle radiation is provided. The method includes: generating a filamented pre-discharge that forms a low impedance bridging across an insulator by means of an electrical pre-discharge source; by means of an electrical pre-discharge source, connecting an anode and a cathode that are separated from each other by an insulator and arranged coaxially to each other; forming a plasma layer from a gas with a magnetic field by a discharge of an electric current pulse across the anode and the cathode; forming a plasmoid in front of the anode as a result of an electrical field; and emitting from the plasmoid one or more ion beams, one or more X-rays, or combinations thereof, wherein the emission is a result of a decay of the magnetic field of the plasmoid and the collision of electrons and ions in the plasmoid.

BRIEF DESCRIPTION OF THE FIGURES

In addition, the invention will be explained with reference to exemplary embodiments illustrated in the figures, from which further advantageous parts and modifications emerge. In the drawings.

DETAILED DESCRIPTION OF THE FIGURES

While the invention will be described below with reference to detailed embodiments, it should be appreciated that the present invention is based on a general inventive concept that can be applied to a wide variety of specific contexts. The terminology used herein and embodiments described herein merely exemplify and explain specific implementations of the invention, but are not limited thereto. For instance, features described or illustrated as part of one embodiment can also be used in conjunction with another embodiment to yield a further embodiment. It is intended that the present disclosure covers such modifications and developments.

In the following description of the drawings, the same or similar reference signs denote the same or similar components. In general, only the differences in relation to an embodiment will be described. Unless explicitly noted otherwise, the description of a part or aspect of an embodiment will apply to a corresponding part or aspect of another embodiment as well.

Figure 1A:
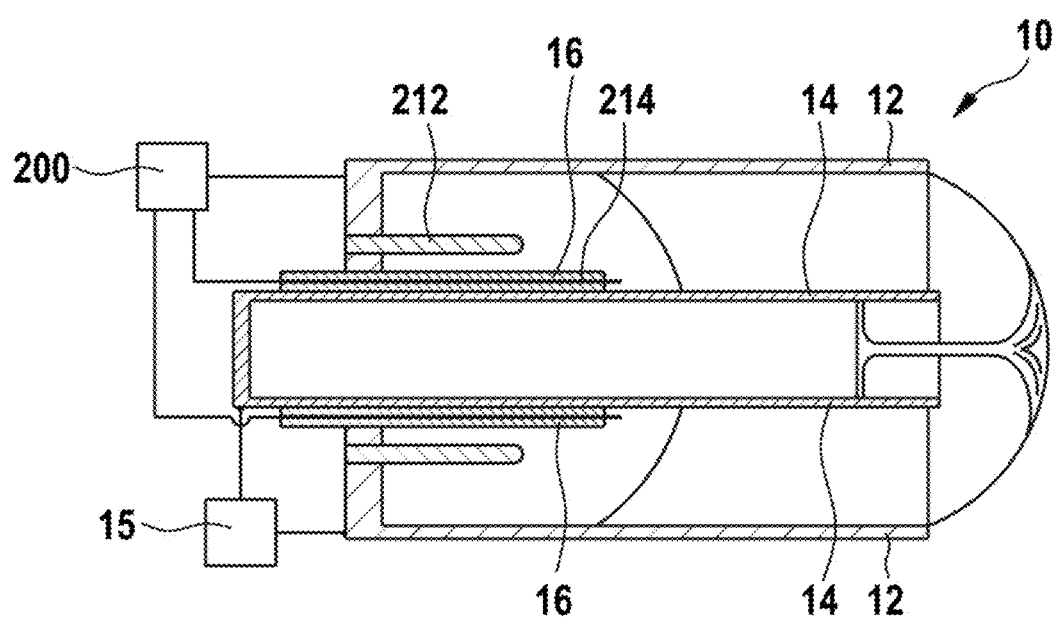
FIG. 1A shows a schematic side view of a device according to the embodiments.

FIG. 1A shows a device 10 for generating X-ray radiation and particle radiation by means of nuclear fusion. The device 10 may, for example, be a plasma focus device 10.

The device 10 may include a first main electrode 14 and/or a second main electrode 12. The first main electrode 14 may be an anode 14 and/or the second main electrode 12 may be a cathode 12. Alternatively, the first main electrode 14 may be a cathode 14 and/or the second main electrode 12 may be an anode 12. The choice of the sign of the voltage between the first main electrode 14 and the second main electrode 12 may deliver specific advantages. For example, the second main electrode 12 may provide a larger surface and thus dissipate heat better. Hereinafter, the first main electrode 14 will be referred to as the anode and the second main electrode 12 as the cathode 12. This is however by way of example only and should not be interpreted as limiting. The present application thus also includes the embodiments that differ from embodiments described herein in that the first main electrode 14 is the cathode and the second main electrode 12 is the anode 12.

The first main electrode 14 and the second main electrode 12 may be separated from each other by an insulator 16. The first main electrode 14 and the second main electrode 12 may be arranged coaxially to each other. The first main electrode 14 and the second main electrode 12 may be at least partially disposed in a reactor chamber (not shown).

The cathode 12 may alternatively be designed as a hollow cylinder (see FIG. 3B) since in particular the filamentation of the discharge may be effected by the auxiliary electrodes.

The first main electrode 14 may be an anode 14 and/or the second main electrode 12 may be a cathode 12. Alternatively, the first main electrode 14 may be a cathode 14 and/or the second main electrode 12 may be an anode 12.

In the embodiments described herein, the second main electrode 12 may take the form of a hollow cylinder. In particular, the second main electrode 12 may include a non-magnetic or only weakly magnetic material. Alternatively or additionally, the second main electrode 12 may include a plurality of second main-electrode electrodes 12.

The device 10 may include a pre-discharge device or auxiliary discharge device for generating a filamented pre-discharge or auxiliary discharge. The filamented pre-discharge may form a low-impedance, in particular a filamented, bridging over the insulator 16. In particular the pre-discharge may generate a controlled conductive connection over the insulator that leads to the formation of filaments. For the duration of the pre-discharge, a current may, therefore, flow parallel to the insulator, in particular at defined points, between which filaments can form. The filaments may form in particular between two paired points in each case. The device 10 may further include a pre-discharge source 200 or auxiliary discharge source 200, in particular having high internal resistance. The pre-discharge source 200 may be connected to the pre-discharge device.

The pre-discharge may be generated in different ways. For example, the pre-discharge may be a glow discharge, a dielectric barrier discharge, a microwave plasma, and/or an RF (radio frequency) plasma. A glow discharge may be generated, for example, with a glow discharge device as described herein. A glow discharge may, in particular, be generated with little effort and in a simple manner. For example, a glow discharge of less than 100 W and 2 kV may be generated.

A dielectric barrier discharge may be generated, for example, with a dielectric barrier discharge device in which an alternating voltage is applied between at least two electrodes. In a dielectric barrier discharge, an auxiliary electrode may be disposed in the insulator 16 such that the auxiliary electrode 16 is sealed off by the insulator 16. In the case of a dielectric barrier discharge, a dielectric barrier discharge source applies an alternating voltage to the auxiliary electrode thus isolated, whereas in the case of the glow-discharge source a DC voltage is applied.

By the displacement currents thus generated, the dielectric barrier discharge may be generated through the insulator 16 and/or electrical power may be transmitted into the plasma.

For example, a microwave plasma may be generated with a microwave plasma device connected to a microwave plasma source. For example, a waveguide and/or λ/4 resonator may be used for this purpose.

For example, an RF plasma may be generated with an RF plasma device connected to an RF plasma source. An RF plasma with a frequency of 13.56 mHz may typically be generated. Both a capacitive and an inductive coupling of the power is possible.

The examples mentioned may produce a plasma which has low energy and/or a high conductivity. Such a plasma may be particularly advantageous for the pre-discharge described herein.

Although the disclosure is exemplified below in the context of a glow discharge, the general principles will also apply to other kinds of pre-discharge, and the disclosure is not intended to be limited to the example of glow discharge despite there being special advantages associated with glow discharge. Accordingly in what follows, "pre-discharge" is also referred to as "glow discharge", and thus also the "pre-discharge device" as the "glow discharge device" and the "pre-discharge source" as the "glow-discharge source". However, the terms may be regarded as analogous to the extent that they do not impose a specific restriction on the glow discharge.

Figure 1B:
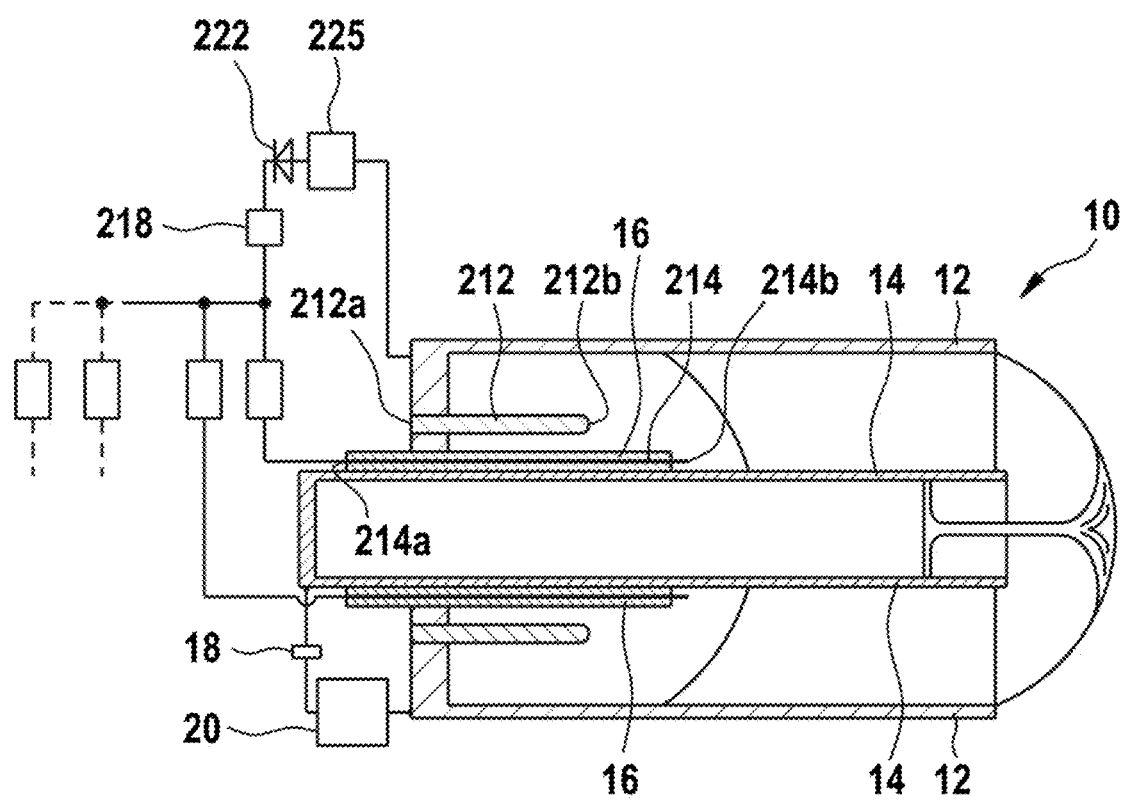
FIG. 1B shows a schematic side view of a device according to the embodiments.

As shown in FIG. 1B, the pre-discharge device or glow discharge device may include a first auxiliary electrode 214 and/or a second auxiliary electrode 212. The first auxiliary electrode 214 and the second auxiliary electrode 212 may be separated from each other by the insulator 16. The first auxiliary electrode 214 and the second auxiliary electrode 212 may be arranged concentrically axially parallel to one another around the anode 14. The first auxiliary electrode 214 and the second auxiliary electrode 212 may be at least partially disposed in the reactor chamber. The first auxiliary electrode 214 may include a plurality of first auxiliary electrodes 214. The second auxiliary electrode 212 may include a plurality of second auxiliary electrodes 212. The plurality of second auxiliary-electrode electrodes 212 and the plurality of first auxiliary-electrode electrodes 214 may be disposed coaxially. Furthermore, a second auxiliary-electrode electrode 212 of the plurality of second auxiliary-electrode electrodes 212 may be arranged axially parallel to a corresponding first auxiliary-electrode electrode 214 of the plurality of first auxiliary-electrode electrodes 214. The first auxiliary-electrode electrodes 214 and the second auxiliary-electrode electrodes 212 may be configured to form a glow discharge between the first auxiliary-electrode electrodes 214 and the second auxiliary-electrode electrodes 212.

According to embodiments described herein, a number of the plurality of cathode electrodes 12 may correspond to a number of the plurality of first auxiliary electrodes 214 and/or a number of the plurality of second auxiliary electrodes 212.

According to embodiments described herein, the first auxiliary electrode 214 may be an auxiliary anode 214 and/or the second auxiliary electrode 212 may be an auxiliary cathode 212 (as shown in FIG. 1B). Alternatively, the first auxiliary electrode 214 may be an auxiliary cathode 214 and/or the second auxiliary electrode 212 may be an auxiliary anode 212.

The device 10 may contain a gas in the reactor chamber.

The device 10 may include an electrical pre-discharge source 200 or glow-discharge source 200. The electrical glow-discharge source may have a high internal resistance. The electrical glow-discharge source may be electrically connected to the auxiliary anode 214 and to the auxiliary cathode 212. A glow discharge may be generated between the auxiliary anode 214 and the auxiliary cathode 212 as a result of an electrical pre-discharge of the electrical glow-discharge source.

The device 10 may include an electrical discharge source 15. The electrical discharge source 15 may be electrically connected to the anode 14 and to the cathode 12. A dense magnetically confined plasmoid may be generated in front of the anode 14 as a result of an electrical discharge from the electrical discharge source and one or more ion beams, one or more X-rays, or combinations thereof may be emitted.

In particular the device 10 may contain a plasma focus device 10, as described by Lerner et al. in U.S. Pat. No. 7,482,607 B2 and EP 1 989 714 B1, the entire contents of which are hereby incorporated by reference in this application, but extended by a device for generating a defined glow discharge. The device for generating a defined glow discharge may include the first auxiliary electrode 214, the second auxiliary electrode 212, and/or the electrical pre-discharge source 200.

The glow discharge may be generated as a steady-state glow discharge. In the context of the present disclosure, a "steady-state glow discharge" may be understood as a glow discharge whose moment of inertia is (exactly) equal to zero. Furthermore, this means that at the beginning of the high-current main discharge by the electric discharge source, a strongly ionized pre-discharge may be present. This can prevent high-energy runaway electrons, which would be generated if there were no glow discharge, from eroding the anode and thereby introducing impurities into the plasma and consequently strong radiation cooling. In practice, embodiments may stabilize the plasmoid.

The glow discharge may be designed in such a way that it includes and/or consists of a plurality of individual discharges. The plurality of individual discharges may be connected in parallel to one another. The number of the plurality of individual discharges may be identical to the number of the plurality of auxiliary-cathode electrodes 12. A few picoseconds to milliseconds later, the main discharge may form. The parallel-connected individual glow discharges may reduce the total inductance in inverse proportion to their number and may thus allow a faster rise in the main discharge current.

As shown in FIG. 1B, the device 10 may have a nested electrode design. In particular, the cathode 12 may be disposed around the anode 14. Furthermore, the first auxiliary electrode 214 may be disposed around the anode 14. The second auxiliary electrode 212 may be disposed around the first auxiliary electrode 214. The cathode 14 may be disposed around the second auxiliary electrode 212. In particular, the anode 14, the cathode 12, the first auxiliary electrode 214 and/or the second auxiliary electrode 212 may be arranged coaxially and/or concentrically axially parallel to one another.

The cathode 12 may include, for example, the plurality of cathode electrodes 12 or take the form of a hollow cylinder. The cathode electrodes 12 may be uniformly distributed rods. The anode 14 may be configured as a hollow cylinder.

The insulator 16 may surround the anode 14, in particular a base of the anode 14. For example, the device 10 may include nested beryllium electrodes. The cathode 12, the anode 14, the second auxiliary electrode 212 and/or the first auxiliary electrode 214 may be enclosed in the reactor chamber, which may be a vacuum chamber, with a gas (e.g., diborane) under low pressure that fills a space between them, in particular in order to provide the fuel for the reaction.

The anode 14 may be connected to the cathode 12 through one or more capacitor banks 18 and one or more switches 20. The one or more capacitor banks 18 and the one or more switches 20 may form the electrical discharge source 15 and/or be part of it. The first auxiliary electrode 214 may be connected to the second auxiliary electrode 212 through one or more auxiliary capacitor banks 218 or DC sources 218 and one or more auxiliary switches 220. The auxiliary switch 220 may be a low-power switch. The one or more auxiliary capacitor banks 218 and the one or more auxiliary switches 220 may form and/or be part of the electrical pre-discharge source 200 or glow-discharge source 200. The electrical pre-discharge source 200 or glow-discharge source 200 may possibly also be realized inductively by means of an ignition transformer.

According to the embodiments described herein, the electrical glow-discharge source may be configured to generate an electrical pre-discharge equal to or greater than 0.5 kV, in particular equal to or greater than 1 kV, preferably equal to or greater than 2 kV. In particular, the voltage of the electrical pre-discharge may depend on a pressure in the reactor chamber. If the pressure in the reactor chamber is comparatively high, then the electrical pre-discharge may be comparatively large and/or vice versa. The electrical glow-discharge source may include one or more internal resistors or series resistors. In particular, the electrical glow-discharge source may include a plurality of series resistors. A number of the plurality of series resistors may correspond to the number of the plurality of the first auxiliary-electrode electrodes 214. The series resistors may be connected to a common voltage source. The voltage source may supply a current of several mA, in particular greater than or equal to 0.8 mA and/or less than or equal to 3 mA, per series resistor and/or per first auxiliary-electrode electrode 214. For example, the series resistors may each have a resistance of 500 kOhm or more. The glow discharge may be ignited a few milliseconds to seconds prior to the main discharge.

The electrical glow-discharge source may further include a diode 222. The diode 222 may be disposed between the one or more switches 220 and the one or more auxiliary capacitor banks 218 or DC sources. In particular, just one switch 220 may be provided in order to switch the one or more auxiliary capacitor banks 218. Furthermore, there may not be any switch 220 provided and the diode 222 may take over the switch function. According to one embodiment, a capacitor bank, such as the one or more auxiliary capacitor banks 218, may be a direct current source. The diode 222 may be a high-voltage diode of low power. The diode 222 may be arranged accordingly depending on which auxiliary electrode 212, 214 is configured as an auxiliary anode or auxiliary cathode. Embodiments can thus be implemented in practice in a small, compact and cost-effective manner.

According to other embodiments described herein, the electrical glow-discharge source may be configured to generate the glow discharge between the first auxiliary electrode 214 and the second auxiliary electrode 212. In particular, the electrical glow-discharge source may be configured to generate the glow discharge only between the first auxiliary electrode 214 and the second auxiliary electrode 212.

According to embodiments described herein, the cathode 12 may include a conductive disk. The plurality of cathode-electrodes 12 may be mounted on the disk. In particular, the conductive disk may extend toward the anode 14. For example, the conductive disk may have a recess in which the anode 14 and/or the insulator 16 are arranged. In particular, the insulator 16 may be arranged between the conductive disk of the cathode 12 and the anode 14.

According to embodiments described herein, the cathode 12 and the auxiliary cathode (i.e., the auxiliary electrode 212, 214 that is configured as an auxiliary cathode) may be electrically connected to each other. For example, the auxiliary-cathode electrodes (i.e., the auxiliary-electrode electrodes 212, 214 that are configured as auxiliary-cathode electrodes) may be mounted on and/or in the cathode 12. In particular, the plurality of auxiliary-cathode electrodes may be uniformly distributed rods that are mounted in the cathode 12. If the cathode 12 and the auxiliary cathode are electrically connected to each other, the electrical glow-discharge source may be connected to the cathode 12.

The second auxiliary-electrode electrodes 212 may each have a first end 212a and a second end 212b. The first end 212a may be connected to the electrical pre-discharge source, a ground potential and/or the cathode 12. The second end 212b may face away from the first end 212a. The first auxiliary-electrode electrodes 214 may each have a first end 214a and a second end 214b. The first end 214a may be connected to the electric pre-discharge source. The second end 214b may face away from the first end 214a.

According to embodiments described herein, a distance between the second end 214b of the first auxiliary-electrode electrodes 214 and the second end 212b of the second auxiliary-electrode electrodes 212 may be smaller than a distance between the second end 214b of the first auxiliary-electrode electrodes 214 and the cathode 12, in particular a closest point of the cathode 12. It may thereby be ensured that the glow discharge is formed between the first auxiliary electrode 214 and the second auxiliary electrode 212 and in particular not between the first auxiliary electrode 214 and the cathode 12.

The second end 214 of the first auxiliary-electrode electrodes 214 and the second end 212b of the second auxiliary-electrode electrodes 212 may have a different height in parallel and concentrically along an axis of the anode 14. For example, the second end 214 of the first auxiliary-electrode electrodes 214 may be farther away from the conductive disk of the cathode 12 than the second end 212b of the second auxiliary-electrode electrodes 212. By means of this suspended arrangement, a hot, more easily ionizable gas column may be generated.

Figure 2:
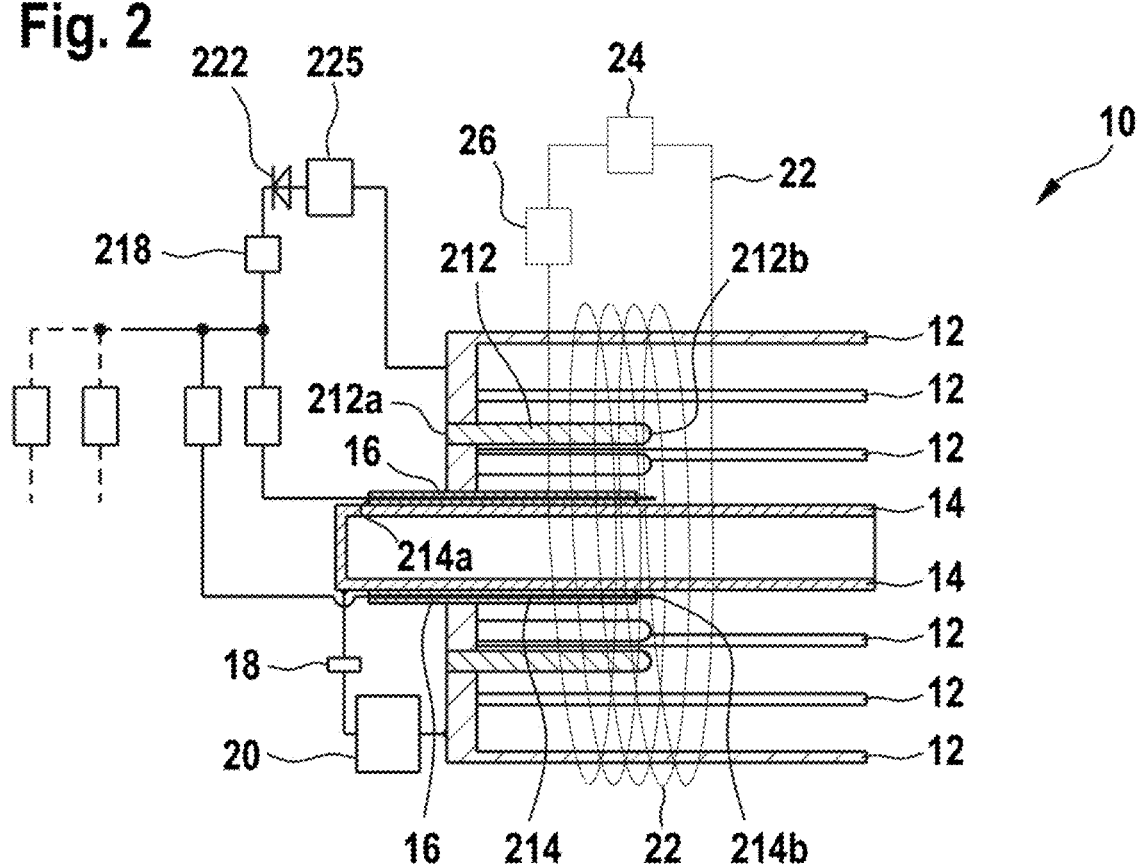
FIG. 2 shows a schematic side view of a device according to the embodiments.

As shown in FIG. 2, the device 10 may include a coil 22. The coil 22 may be a helical coil 22. The coil 22 may be disposed around the anode 14, the cathode 12, the first auxiliary electrode 212, and/or the second auxiliary electrode 214. The coil 22 may generate a magnetic field that can impart angular momentum and thus moment of inertia to the plasmoid. The coil 22 may be connected to a switch 26. A voltage source 24 may also be provided. The voltage source 24 may be separate from the voltage source of the electrical glow-discharge source and/or the electrical discharge source. The coil may thereby be operated independently of the electrical glow-discharge source and/or the electrical discharge source. Alternatively, a common voltage source may also be used. A position of the coil 22 as well as its number of turns may depend on the specific application.

Figure 3A:
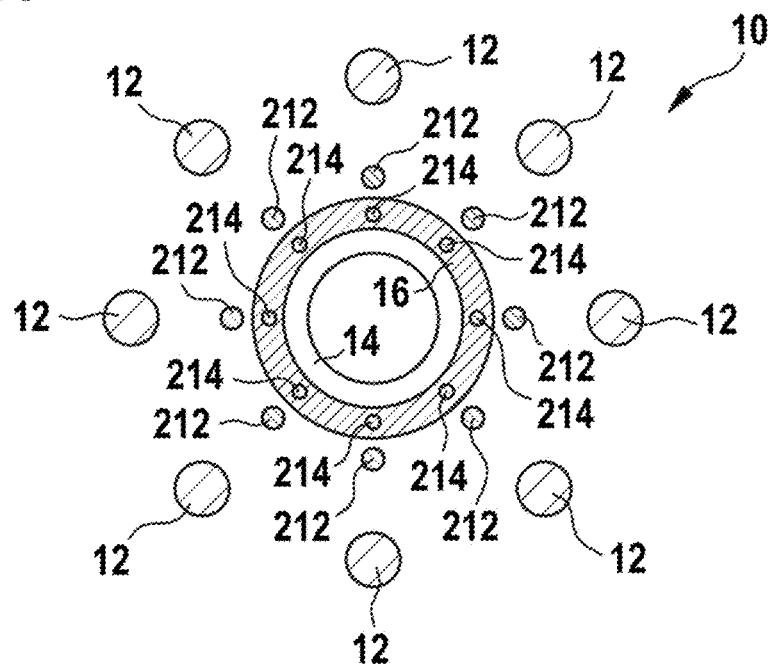
FIG. 3A shows a schematic plan view of a device according to the embodiments.

FIG. 3A shows in a plan view an arrangement of the anode 14, the cathode 12, the first auxiliary electrode 214, the second auxiliary electrode 212 and the insulator 16.

Figure 3B:
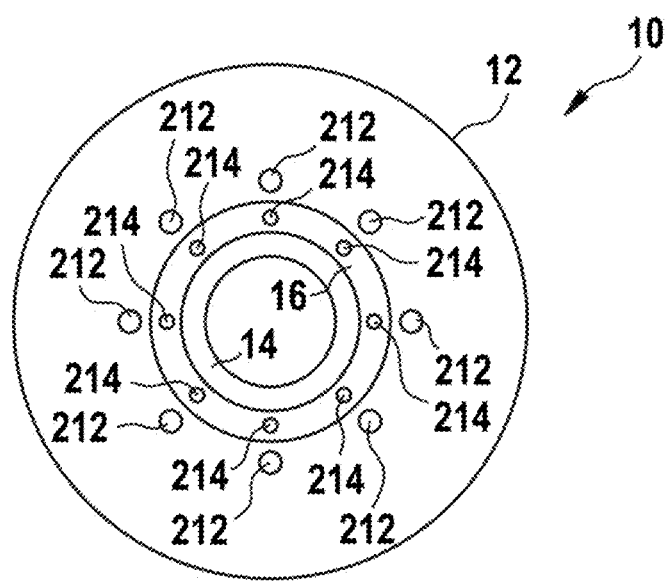
FIG. 3B shows a schematic plan view of a device according to the embodiments.

FIG. 3B shows in plan view an arrangement of the anode 14, the cathode 12, the first auxiliary electrode 214, the second auxiliary electrode 212 and the insulator 16. Here the cathode 12 is designed as a hollow cylinder.

According to embodiments described herein, the first auxiliary-electrode electrodes 214 may run within the insulator 16. According to embodiments described herein, the insulator 16 may thus at least partially enclose the first auxiliary-electrode electrodes 214. In particular, the second auxiliary-electrode electrodes 214 may take the form of thin conductors miming within the insulator 16. Furthermore, the second auxiliary-electrode electrodes 214 may run axially parallel symmetrically within the insulator 16. The second ends 214*b* or anode-side ends of the first auxiliary-electrode electrodes 214 may protrude from the insulator 16. The second ends 214*b* of the first auxiliary-electrode electrodes 214 may thus protrude from the insulator 16.

The second auxiliary-electrodes 212 may be formed as projecting pins of the conductive disk of the cathode 12. By a suitable choice of material for the second auxiliary electrode 212, the stability of the glow discharge may be optimized.

As shown in FIGS. 3A and 3B, for each first auxiliary-electrode electrode 214, a second auxiliary-electrode electrode 212 and/or a cathode electrode 12 may be arranged on a radial line starting from a center point of the anode 14. In particular, along the radial line, a distance between the first auxiliary-electrode electrode 214 and the second auxiliary-electrode electrode 212 may be less than a distance between the first auxiliary-electrode electrode 214 and the cathode electrode 12. The number of the first auxiliary-electrode electrode 214, of the second auxiliary-electrode electrode 212 and/or the cathode electrodes 12 may correspond to each other.

Figure 4:
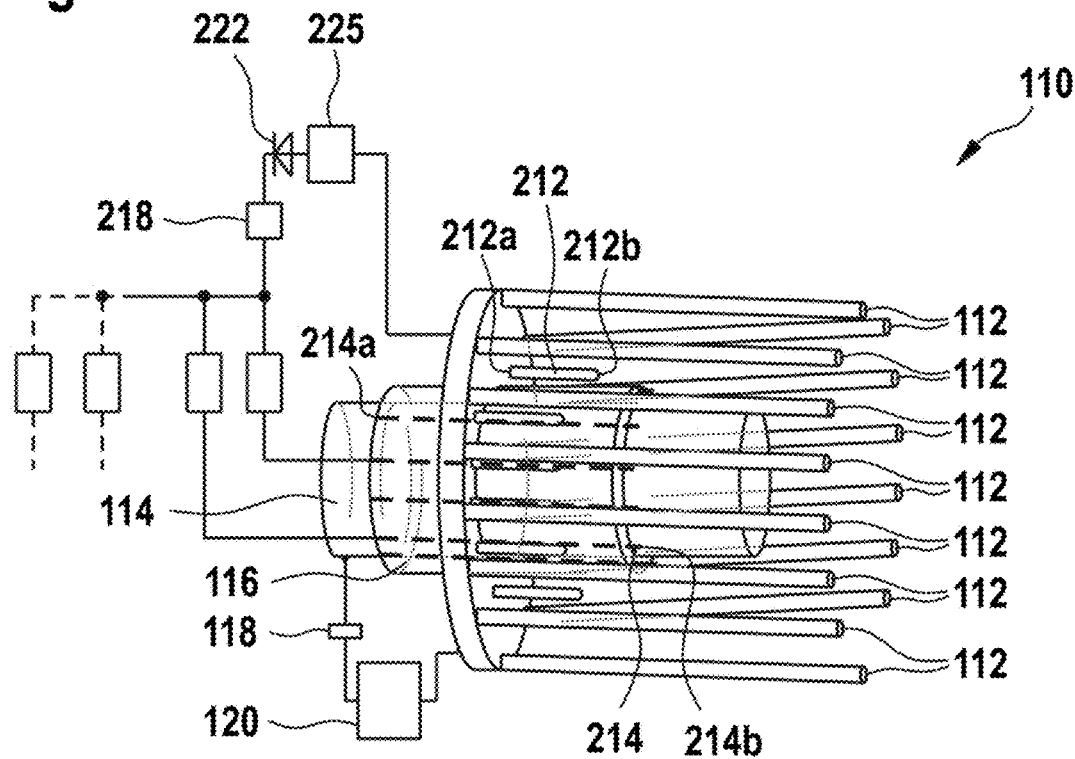
FIG. 4 shows a schematic side view of a device according to the embodiments.

As shown in FIG. 4, the cathode 12, in particular the plurality of cathode electrodes 12, may be inclined or tilted. The degree of inclination may depend on the intended application. For example, the cathode 12, in particular the plurality of cathode electrodes 12, may be inclined by an angle equal to or more than 0.05° and/or equal to or less than 10°, for example, 0.3°. The inclination may be tangential to the axis of the anode 12. As a result of the inclination of the cathode 12, an angular momentum may be applied to the plasmoid, which consequently generates a defined moment of inertia.

Furthermore, the first end 212*a* of the second auxiliary electrode 212, in particular the first ends 212*a* of a plurality of the second auxiliary-electrode electrodes 212, may be aligned with the first end 214*a* of the first auxiliary electrode 214, in particular the first ends 214*a* of the plurality of first auxiliary-electrode electrodes 214. This may be particularly advantageous when the cathode 12, in particular the plurality of cathode electrodes 12, is inclined or tilted.

Figure 5:
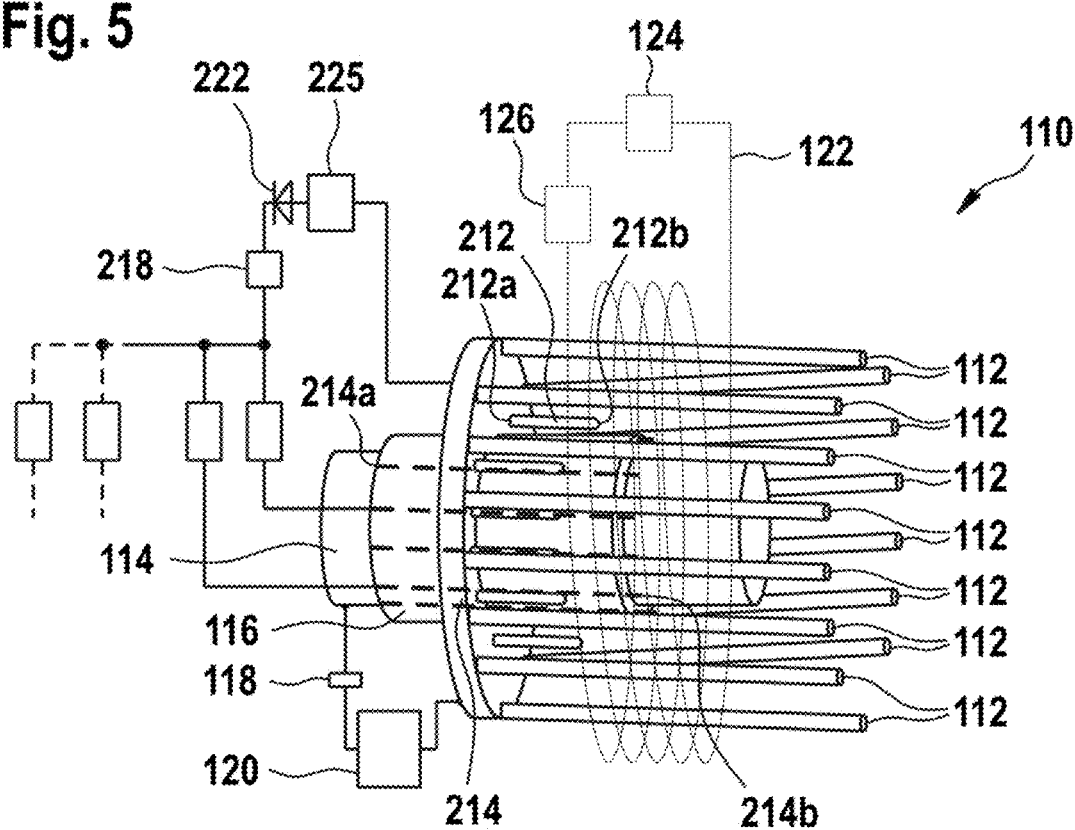
FIG. 5 shows a schematic side view of a device according to the embodiments.

FIG. 5 shows by way of example the device 10 with the inclined cathode 12 and the coil 22. This combination offers the advantage of allowing a variable angular momentum to act on the plasmoid. The coil 22 may thus be configured to apply a variable angular momentum to the plasmoid, in particular to impart a variable moment of inertia to the plasmoid at the end of acceleration.

Embodiments described herein provide a fusion reactor. The fusion reactor may have at least one device 10 for generating X-ray radiation and particle radiation. The fusion reactor may have at least one energy recovery device, which may recover energy contained in the X-ray radiation and/or particle radiation. In particular, the energy recovery device may convert into electrical energy the energy contained in the X-ray radiation and/or particle radiation. The energy contained in the X-ray radiation may, for example, be converted into electrical energy by using the photoelectric effect. Furthermore, the energy contained in the particle beam may be converted by using a transformer, in this regard see, for example, Lerner et al., FIG. 11. The particle beam may be a pulsed current, which may thus represent a primary winding of the transformer.

Figure 6:
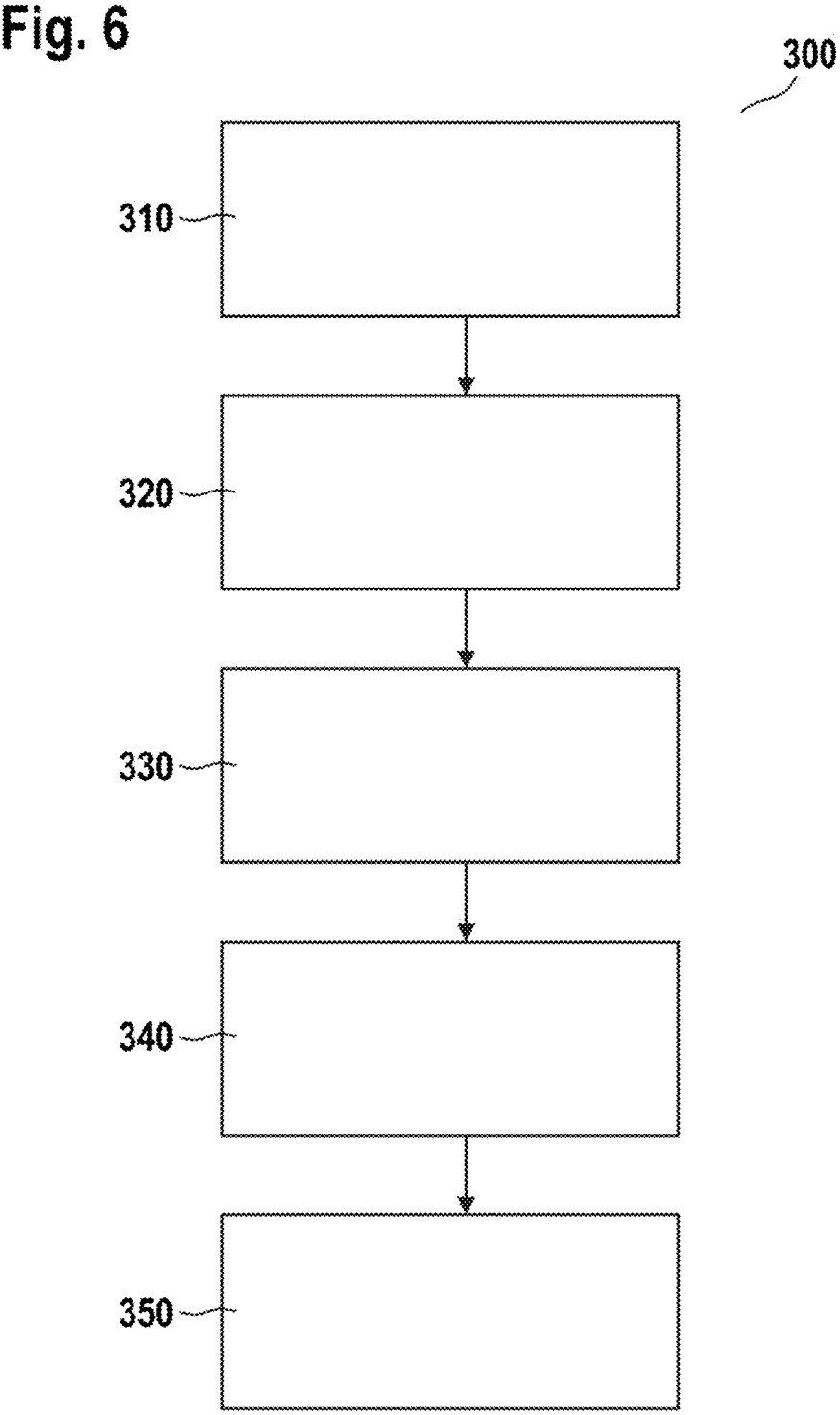
FIG. 6 shows a flow chart of a method according to the embodiments.

FIG. 6 shows a method 300 for generating X-ray radiation and particle radiation. The method may include one or more of the blocks 310 to 360. According to block 310, a filamented pre-discharge, which forms a low-impedance bridging over an insulator 16, may be generated by means of an electrical pre-discharge source. For example, a first auxiliary electrode 214 and a second auxiliary electrode 212 that are separated from each other by the insulator 16 and arranged coaxially to each other may be connected by an electrical pre-discharge source. According to an optional block 320, a pre-discharge between the first auxiliary electrode 214 and the second auxiliary electrode 212 may be formed by a pre-discharge of an electrical pre-discharge current through the first auxiliary electrode 214 and the second auxiliary electrode 212. In particular, the pre-discharge may be generated using the electrical pre-discharge source. According to block 330, an anode 14 and a cathode 12, which are separated from each other by an insulator 16 and arranged coaxially to each other, may be connected by an electrical discharge source. According to block 340, a plasma layer of a gas having a magnetic field may be formed by a discharge of an electrical current pulse across the anode 14 and the cathode 12. In particular, the discharge or main-current discharge may be generated using the electrical discharge source. For example, the discharge may occur within 1 μs or more after the pre-discharge. According to block 350, a plasmoid may be formed in front of the anode 14 as a result of the magnetic field. According to block 360, one or more particle beams, one or more X-rays, or combinations thereof, may be emitted from the plasmoid. In particular the emission may be a result of a decay of the magnetic field of the plasmoid and the collision of electrons and ions in the plasmoid.

While the foregoing refers to embodiments of the disclosure, other and further embodiments of the disclosure may be derived without departing from the scope of protection of the disclosure. It is intended that the disclosure includes such modifications and developments. The scope of protection is determined by the appended claims.

The invention claimed is:

1. Device for generating X-ray radiation and particle radiation by means of nuclear fusion, comprising:
   an anode and a cathode, which are separated from each other by an insulator and are arranged coaxially to each other, wherein the anode and the cathodes are arranged at least partially in a reactor chamber;
   a pre-discharge device for generating a filamented pre-discharge forming a low impedance bridging over the insulator;
   a gas that is contained in the reactor chamber;
   an electrical pre-discharge source, especially with high internal resistance, which is connected to the pre-discharge device; and
   an electric discharge source electrically connected to the anode and the cathode, wherein a dense magnetically confined plasmoid is generated in front of the anode as a result of an electrical discharge from the electrical discharge source and emits one or more ion beams, one or more X-ray beams, or combinations thereof, wherein the pre-discharge device comprises a first auxiliary electrode and a second auxiliary electrode separated from each other by the insulator and arranged axially parallel to each other, wherein the first auxiliary electrode and the second auxiliary electrode are partially arranged in the reactor chamber, the first auxiliary electrode having a plurality of first auxiliary-electrode electrodes and the second auxiliary electrode having a plurality of second auxiliary-electrode electrodes, and wherein the first auxiliary electrode and the second auxiliary electrode are configured to form a filamented pre-discharge between the first auxiliary-electrode electrodes and the second auxiliary-electrode electrodes.

2. Device according to claim 1, wherein the first auxiliary electrode and the second auxiliary electrode are configured to form a filamented glow discharge between the first auxiliary-electrode electrodes and the second auxiliary-electrode electrodes, and/or wherein the electrical pre-discharge source is electrically connected to the first auxiliary electrode and the second auxiliary electrode, wherein a filamented pre-discharge, in particular a filamented glow discharge, is generated between the first auxiliary electrode and the second auxiliary electrode as a result of the electrical pre-discharge of the electrical pre-discharge source.

3. Device according to claim 1, wherein the first auxiliary electrode is an auxiliary anode, the first auxiliary-electrode electrodes are auxiliary-anode electrodes, the second auxiliary electrode is an auxiliary cathode and the second auxiliary-electrode electrodes are auxiliary-cathode electrodes, or wherein the first auxiliary electrode is an auxiliary cathode the first auxiliary-electrode electrodes are auxiliary-cathode electrodes the second auxiliary electrode is an auxiliary anode and the second auxiliary-electrode electrodes are auxiliary-anode electrodes.

4. Device according to claim 1, wherein the cathode comprises a plurality of cathode electrodes.

5. Device according to claim 4, wherein the cathode has a conductive disk and the plurality of cathode electrodes are mounted on the disk.

6. Device according to claim 2, wherein a number of the plurality of cathode electrodes corresponds to a number of the plurality of first auxiliary-electrode electrodes and/or a number of the plurality of second auxiliary-electrode electrodes.

7. Device according to claim 3, wherein the cathode and the auxiliary cathode are electrically connected to each other, in particular short-circuited.

8. Device according to claim 2, wherein the insulator at least partially encloses the first auxiliary-electrode electrodes, in particular wherein the first auxiliary-electrode electrodes run within the insulator, are separated from one another and/or are arranged coaxially to the anode.

9. Device according to claim 2, wherein the electrical pre-discharge source is configured to generate an electrical pre-discharge equal to or greater than 0.5 kV, in particular equal to or greater than 1 kV, preferably equal to or greater than 2 kV, by means of a plurality of series resistors.

10. A fusion reactor having a device for generating X-ray radiation and particle radiation as claimed in claim 1.

11. Method for generating X-ray radiation and particle radiation, comprising:

generation of a filamented pre-discharge that forms a low-impedance bridging over an insulator, by means of an electric pre-discharge source;

connection of an anode and a cathode, which are separated from each other by the insulator and are arranged coaxially to each other, by means of an electrical discharge source;

formation of a plasma channel from a gas having a magnetic field by a discharge of an electrical current pulse via the anode and the cathode;

formation of a plasmoid in front of the anode as a result of the magnetic field; and emission, from the plasmoid, of one or more particle beams, one or more X-ray beams, or combinations thereof, wherein the emission is a result of a decay of the magnetic field of the plasmoid and the collision of electrons and ions in the plasmoid.

12. The method according to claim 11, wherein the discharge occurs within 1 ρs or more after the pre-discharge.

* * * * *